(12) United States Patent
Wang et al.

(10) Patent No.: US 11,120,385 B2
(45) Date of Patent: Sep. 14, 2021

(54) JOB LEVEL PREDICTION

(71) Applicant: ADP, LLC, Roseland, NJ (US)

(72) Inventors: Xiaojing Wang, Warren, NJ (US); Min Xiao, Caldwell, NJ (US); Dmitry Alexandrovich Tolstonogov, Roseland, NJ (US); Lei Xia, Jersey City, NJ (US)

(73) Assignee: ADP, LLC, Roseland, NJ (US)

( * ) Notice: Subject to any disclaimer, the term of this patent is extended or adjusted under 35 U.S.C. 154(b) by 292 days.

(21) Appl. No.: 15/448,590

(22) Filed: Mar. 3, 2017

(65) Prior Publication Data

US 2018/0253668 A1   Sep. 6, 2018

(51) Int. Cl.
*G06Q 10/06* (2012.01)
*G06Q 10/10* (2012.01)

(52) U.S. Cl.
CPC ..... *G06Q 10/067* (2013.01); *G06Q 10/06311* (2013.01); *G06Q 10/1053* (2013.01)

(58) Field of Classification Search
CPC ........... G06Q 10/067; G06Q 10/06311; G06Q 10/1053; G06F 17/18; Y04S 10/54
See application file for complete search history.

(56) References Cited

U.S. PATENT DOCUMENTS

| | | |
|---|---|---|
| 8,818,910 B1 | 8/2014 | Liu et al. |
| 9,679,226 B1 * | 6/2017 | Huang ...................... G06T 7/11 |
| 10,242,232 B1 * | 3/2019 | Hurry ................. G06F 21/6281 |
| 2002/0046199 A1 | 4/2002 | Scarborough et al. |
| 2003/0212520 A1 * | 11/2003 | Campos ............... G06K 9/6223 702/101 |
| 2005/0138420 A1 * | 6/2005 | Sampathkumar ...... G06Q 10/10 726/4 |
| 2006/0265268 A1 * | 11/2006 | Hyder ............ G06Q 10/063112 705/321 |
| 2009/0006427 A1 * | 1/2009 | Veeraraghavan ...... G06Q 10/00 |
| 2009/0157462 A1 * | 6/2009 | Morinville ............. G06Q 10/10 705/7.11 |
| 2010/0023355 A1 * | 1/2010 | Sagalow ................ G06Q 40/08 705/4 |

(Continued)

FOREIGN PATENT DOCUMENTS

WO   WO-2019083626 A1 *  5/2019  ......... G06F 21/6281

OTHER PUBLICATIONS

ESL2012, Jun. 18, 2015, https://www.usbr.gov/gp/employment/neo/tab6/ELS2012.pdf, p. 2-4.*

(Continued)

*Primary Examiner* — Jerry O'Connor
*Assistant Examiner* — James Webb
(74) *Attorney, Agent, or Firm* — Yee & Associates, P.C.

(57) ABSTRACT

A method, computer system, and computer program product for determining job levels of an employee within an organization. A computer system identifies employee data for the employee. The computer system determines whether the employee is a manager or a non-manager based on the employee data for the employee. The computer system applies a manager employee level model to determine a manager job level of the employee in response to determining that the employee is a manager. The computer system applies a non-manager employee level model to determine a non-manager job level of the employee in response to determining that the employee is a non-manager.

27 Claims, 8 Drawing Sheets

(56) References Cited

U.S. PATENT DOCUMENTS

| | | | | |
|---|---|---|---|---|
| 2010/0100427 | A1* | 4/2010 | McKeown | G06Q 10/067 705/322 |
| 2012/0130915 | A1 | 5/2012 | Diaz et al. | |
| 2014/0122355 | A1 | 5/2014 | Hardtke et al. | |
| 2014/0188768 | A1* | 7/2014 | Bonissone | G06N 20/00 706/12 |
| 2016/0292613 | A1* | 10/2016 | Kurjanowicz | G06Q 10/06398 |
| 2017/0091692 | A1* | 3/2017 | Guo | G06F 16/58 |

OTHER PUBLICATIONS

USCIS, Nov. 26, 2013, https://www.uscis.gov/sites/default/files/files/form/i-140.pdf, p. 2-5.*

Shafiq; Secure interoperation in a multidomain environment employing RBAC policies; Sep. 26, 2005; https://ieeexplore.ieee.org/abstract/document/1512040 ; p. 1-21.*

Molloy; Mining Roles with Multiple Objectives; Dec. 2010; https://dl.acm.org/doi/pdf/10.1145/1880022.1880030 ; p. 1-40.*

"Workday Launches Ventures Fund Focused on Data Science and Machine Learning", Workday, Jul. 14, 2015, 3 pages. https://www.workday.com/en-us/company/newsroom/press-releases/press-release-details.html?id=1971214&_rda=/company/news_events/press_releases/detail.php.

* cited by examiner

FIG. 3
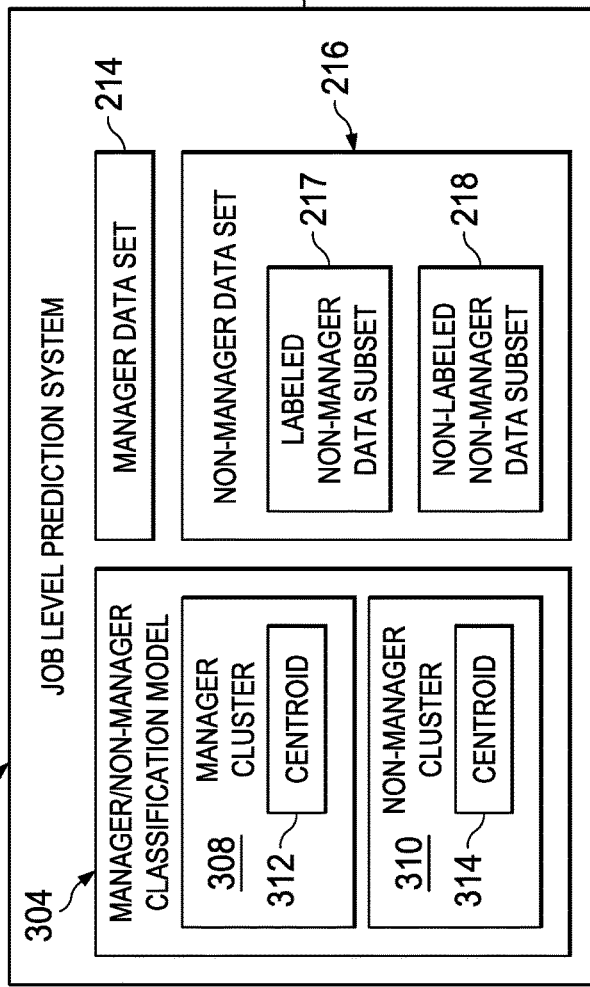
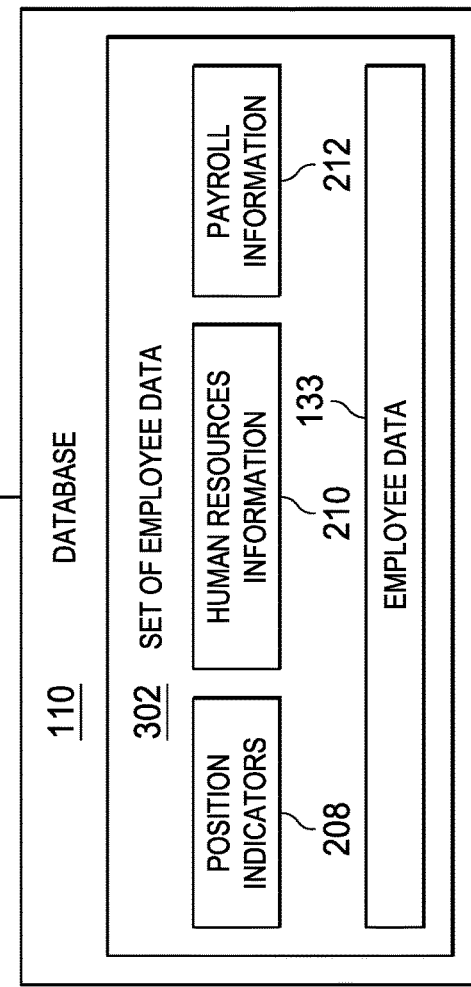
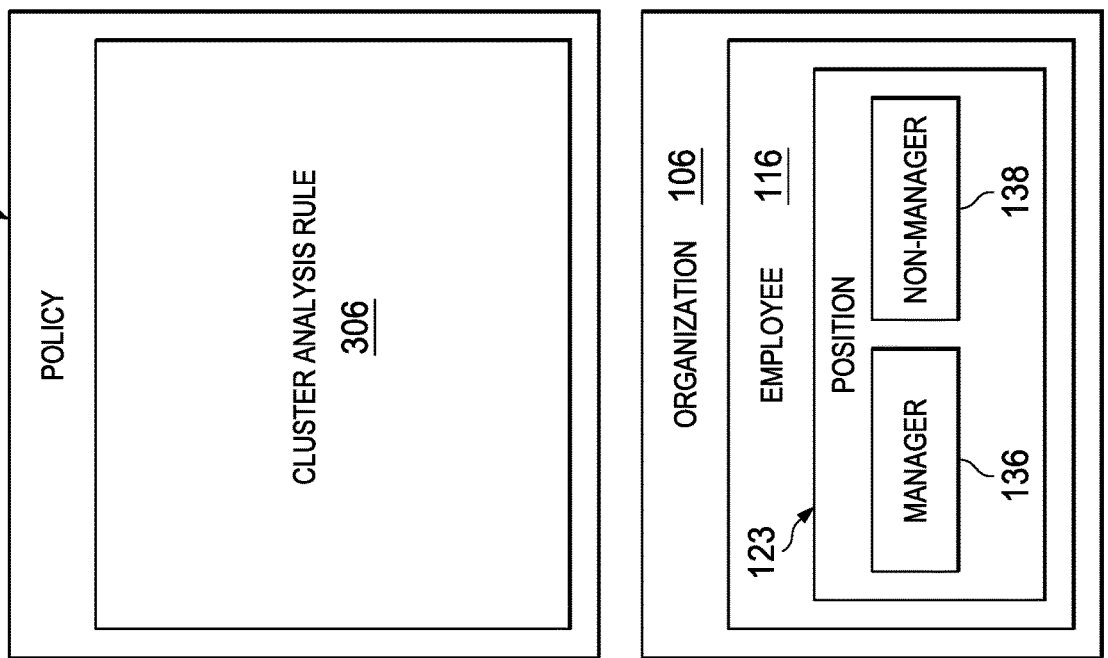

JOB LEVEL PREDICTION

BACKGROUND INFORMATION

1. Field

The present disclosure relates generally to an improved computer system and, in particular, to a method and apparatus for accessing information in a computer system. Still more particularly, the present disclosure relates to a method and apparatus for presenting contextually relevant insights into information in a computer system.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance plans, wellness plans, and other programs and organizations using an employee information system. As yet another example, an information system may be used to hire new employees, assign employees to projects, perform reviews for employees, and other suitable operations for the organization. As another example, a research department in the organization may use an information system to store and analyze information to research new products, analyze products, or for other suitable operations.

Currently used information systems include databases. These databases store information about the organization. For example, these databases store information about employees, products, research, product analysis, business plans, and other information about the organization.

Information about the employees may be searched and viewed to perform various operations within an organization. However, this type of information in currently used databases may be cumbersome and difficult to access relevant information in a timely manner that may be useful to performing an operation for the organization. For example, determining job levels for an employee of an organization may be desirable for operations such as identifying new hires, selecting teams for projects, and other operations in the organization. However, because specific responsibilities and descriptions of job levels for a job position may vary among different organizations, the job levels for an employee often cannot be determined. Therefore, relevant information is often excluded from the analysis and performance of the operation. Furthermore, determining job levels for an employee of an organization may take more time than desired in an information system.

Therefore, it would be desirable to have a method and apparatus that take into account at least some of the issues discussed above, as well as other possible issues. For example, it would be desirable to have a method and apparatus that overcome the technical problem of presenting contextually relevant insights into information.

SUMMARY

An embodiment of the present disclosure provides a method for determining job levels of an employee within an organization. The method identifies employee data for the employee. The method determines whether the employee is a manager or a non-manager based on the employee data for the employee. The method applies a manager employee level model to determine a manager job level of the employee in response to determining that the employee is a manager. The method applies a non-manager employee level model to determine a non-manager job level of the employee in response to determining that the employee is a non-manager.

Another embodiment of the present disclosure provides a computer system comprising a display system and job level prediction system in communication with the display system. The job level prediction system identifies employee data for the employee. The job level prediction system determines whether the employee is a manager or a non-manager based on the employee data for the employee. The job level prediction system applies a manager employee level model to determine a manager job level of the employee in response to determining that the employee is a manager. The job level prediction system applies a non-manager employee level model to determine a non-manager job level of the employee in response to determining that the employee is a non-manager.

Yet another embodiment of the present disclosure provides a computer program product for determining job levels of an employee within an organization comprising a computer-readable storage media, and first program code, second program code, third program code, and fourth program code, stored on the computer-readable storage media. The first program code identifies employee data for the employee. The second program code determines whether the employee is a manager or a non-manager based on the employee data for the employee. The third program code applies a manager employee level model to determine a manager job level of the employee in response to determining that the employee is a manager. The fourth program code applies a non-manager employee level model to determine a non-manager job level of the employee in response to determining that the employee is a non-manager.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of a data flow for separating ambiguously classified employees into two data sets depicted in accordance with an illustrative embodiment;

DETAILED DESCRIPTION

The illustrative embodiments recognize and take into account one or more different considerations. For example, the illustrative embodiments recognize and take into account that an employer may need information about job levels for an employee when performing certain operations. The illustrative embodiments also recognize and take into account that determining job levels for an employee of an organization enables improved performance of operations for an organization.

Thus, the illustrative embodiments provide a method and apparatus for determining job levels of an employee within an organization. In one illustrative embodiment, a computer system identifies employee data for the employee. The computer system determines whether the employee is a manager or a non-manager based on the employee data for the employee. The computer system applies a manager employee level model to determine a manager job level of the employee in response to determining that the employee is a manager. The computer system applies a non-manager employee level model to determine a non-manager job level of the employee in response to determining that the employee is a non-manager.

Figure 1:
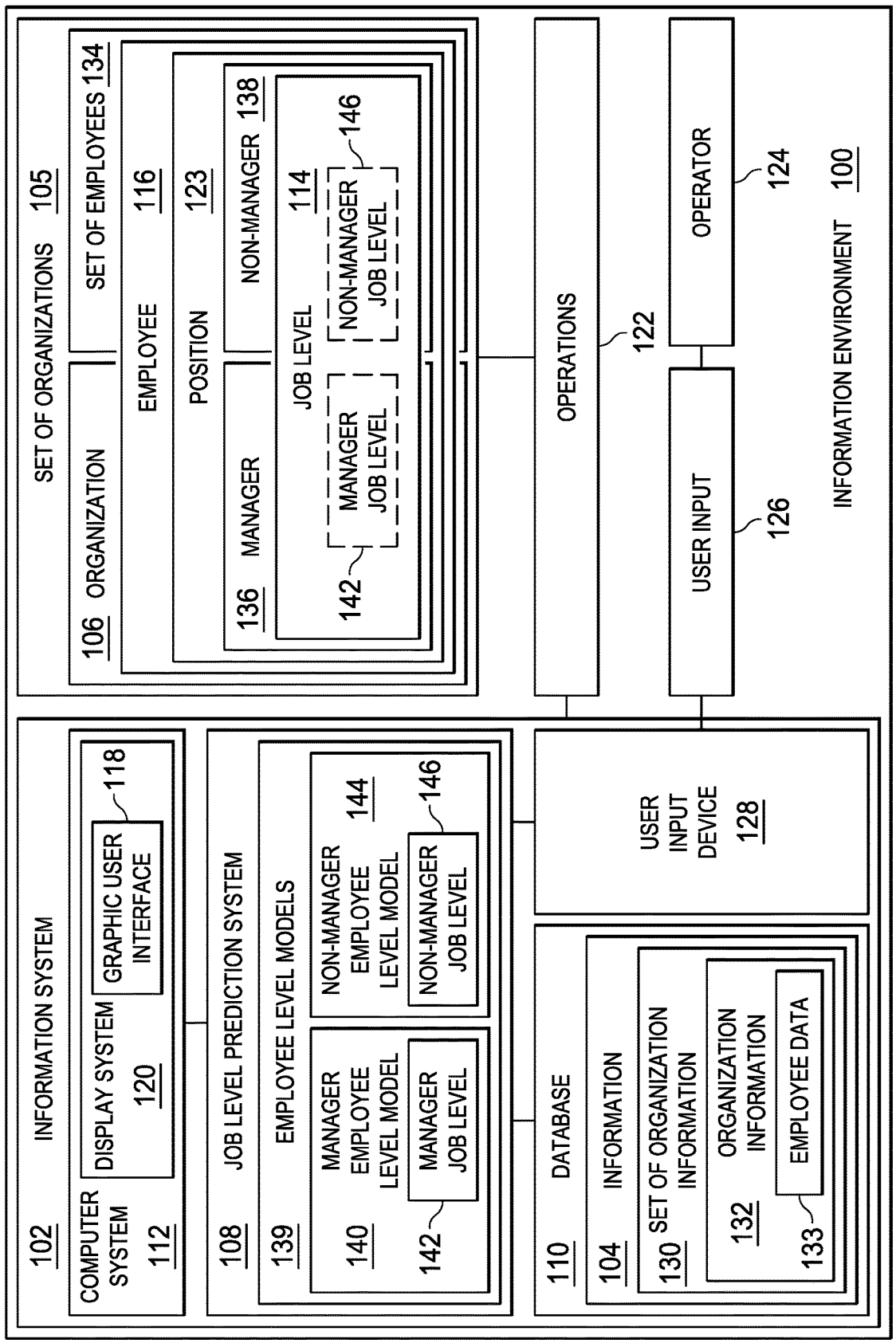
FIG. 1 is an illustration of a block diagram of an information environment depicted in accordance with an illustrative embodiment.

With reference now to the figures and, in particular, with reference to FIG. 1, an illustration of a block diagram of an information environment is depicted in accordance with an illustrative embodiment. In this illustrative example, information environment 100 includes information system 102. Information system 102 manages information 104 about set of organizations 105. Set of organizations 105 is at least one organization, such as organization 106.

Organization 106 may be, for example, a corporation, a partnership, a charitable organization, a city, a government agency, or some other suitable type of organization. Information 104 about organization 106 may include, for example, at least one of information about people, products, research, product analysis, business plans, financials, or other information relating to organization 106.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Information system 102 may take different forms. For example, information system 102 may be selected from one of an employee information system, a research information system, a sales information system, an accounting system, a payroll system, a human resources system, or some other type of information system that stores and provides access to information 104 about organization 106.

In this illustrative example, information system 102 includes different components. As depicted, information system 102 includes job level prediction system 108 and database 110. Job level prediction system 108 and database 110 may be implemented in computer system 112.

As depicted, job level prediction system 108 accesses information 104 to determine job level 114 of employee 116 of organization 106. Job level 114 can then be displayed in graphical user interface 118 in display system 120 in computer system 112, and relied upon when performing operations 122. The access may include at least one of reading, writing, modifying, or operating on information 104.

In this illustrative example, job level prediction system 108 generates job level 114 to differentiate between levels within position 123 of employee 116 in organization 106. By generating job level 114, job level prediction system 108 enables the performance of operations 122 by organization 106.

For example, job level 114 allows organization 106 to standardize compensation for set of employees 134 across equivalent skill sets and responsibilities. Job level prediction system 108 enables organization 106 to perform operations 122 that address business needs of organization 106, including attracting and retaining qualified employees, and providing compensation competitive with other organizations.

Job level prediction system 108 may be implemented in software, hardware, firmware, or a combination thereof. When software is used, the operations performed by job level prediction system 108 may be implemented in program code configured to run on hardware, such as a processor unit. When firmware is used, the operations performed by job level prediction system 108 may be implemented in program code and data and stored in persistent memory to run on a processor unit. When hardware is employed, the hardware may include circuits that operate to perform the operations in job level prediction system 108.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Computer system 112 is a physical hardware system and includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

As depicted, display system 120 is a physical hardware system and includes one or more display devices. The display devices may include at least one of a light emitting diode (LED) display, a liquid crystal display (LCD), an organic light emitting diode (OLED) display, or some other suitable display device.

As depicted, display system 120 includes one or more display devices on which graphical user interface 118 may be displayed. Operator 124 is a person who may interact with graphical user interface 118 through user input 126 generated by user input device 128 in computer system 112. User input device 128 may be, for example, a mouse, a keyboard, a trackball, a touchscreen, a stylus, or some other suitable type of input device.

In this illustrative example, information 104 includes set of organization information 130. Set of organization information 130 includes information for set of organizations 105. Set of organization information 130 includes organization information 132 for organization 106. Organization information 132 may include, for example, at least one of information about people, products, benefits, payroll, research, product analysis, business plans, financials, or some other information relating to organization 106. In one illustrative example, organization information 132 includes employee data 133 for employee 116 of organization 106.

In this illustrative example, job level prediction system 108 determines job level 114 from employee data 133. Job level prediction system 108 determines job level 114 of employee 116 by comparing employee data 133 for employee 116 of organization 106 to set of organization information 130 for set of employees 134 of set of organizations 105. Job level prediction system 108 determines job level 114 for employee 116 by applying a set of employee level models to employee data 133 and set of organization information 130. As depicted, operation 122 is facilitated by determining job level 114 of employee 116. Job level 114 of employee 116 can be displayed in context with employee data 133 on graphical user interface 118, facilitating the performance of operations 122.

As used herein, job level 114 is a scale or metric that differentiates between positions of sets of employees 134 in set of organizations 105. In one illustrative example, position 123 of employee 116 can be manager 136 or non-manager 138 in organization 106. However, job level 114 of employee 116 may be different from others of set of employees 134 that are similarly classified.

For example, within the classification of manager 136, organization 106 may have several different job levels. Job levels of manager 136 may include, for example but not limited to, a supervisor, a manager, and a senior manager. Within the classification of non-manager 138, organization 106 may have several different job levels. Job levels of non-manager 138 may include, for example but not limited to, a junior, an intermediate, and a senior non-manager. As used herein, the term "non-manager" may refer to an employee of organization 106 that is an individual contributor to organization 106, without having management responsibilities for others of sets of employees 134.

By determining job level 114 of employee 116, job level prediction system 108 enables more efficient performance of operations 122 for organization 106. In this illustrative example, operation 122 is an operation performed for the benefit of organization 106. For example, operations 122 can be operations such as, but not limited to, at least one of hiring, benefits administration, payroll, performance reviews, forming teams for new products, assigning research projects, or other suitable operations for organization 106.

For example, job level 114 allows organization 106 to perform operation 122 in a manner that standardizes compensation for set of employees 134 across equivalent skill sets and responsibilities. Job level prediction system 108 enables organization 106 to perform operations 122 that address the business needs of organization 106, including attracting and retaining qualified employees, and providing compensation competitive with other organizations.

In this illustrative example, job level prediction system 108 determines job level 114 for employee 116 by applying one or more employee level models. In this illustrative example, when position 123 of employee 116 is manager 136, job level prediction system 108 uses manager employee level model 140 to determine manager job level 142 of employee 116. In another illustrative example, when position 123 of employee 116 is non-manager 138, job level prediction system 108 uses non-manager employee level model 144 to determine non-manager job level 146.

The illustrative example in FIG. 1 and the examples in the other subsequent figures provide one or more technical solutions to overcome a technical problem of determining job levels for an employee of an organization that make the performance of operations for an organization more cumbersome and time-consuming than desired. For example, when position 123 of employee 116 is manager 136, job level prediction system 108 uses manager employee level model 140 to determine manager job level 142 of employee 116. In another illustrative example, when position 123 employee 116 is non-manager 138, job level prediction system 108 uses non-manager employee level model 144 to determine non-manager job level 146.

In this manner, the use of job level prediction system 108 has a technical effect of determining job level 114 of employee 116 based on set of organization information 130, thereby reducing time, effort, or both in the performance of operations 122. In this manner, operations 122 performed for organization 106 may be performed more efficiently as compared to currently used systems that do not include job level prediction system 108. For example, manager job level 142 and non-manager job level 146 may be used in operations 122 selected from at least one of hiring, benefits administration, payroll, performance reviews, forming teams for new products, assigning research projects, or other suitable operations for organization 106.

As a result, computer system 112 operates as a special purpose computer system in which job level prediction system 108 in computer system 112 enables determining of job level 114 of employee 116 from set of organization information 130 based on one or more employee level models. For example, when position 123 of employee 116 is manager 136, job level prediction system 108 uses manager employee level model 140 to determine manager job level 142 of employee 116. In another illustrative example, when position 123 of employee 116 is non-manager 138, job level prediction system 108 uses non-manager employee level model 144 to determine non-manager job level 146. When manager job level 142 and non-manager job level 146 are determined by employee level models 139, from set of organization information 130, manager job level 142 and non-manager job level 146 determined from set of organization information 130 may be relied upon to perform operations 122 for organization 106.

Thus, job level prediction system 108 transforms computer system 112 into a special purpose computer system as compared to currently available general computer systems that do not have job level prediction system 108. Currently used general computer systems do not reduce the time or effort needed to determine job level 114 of employee 116 based on set of organization information 130. Further, currently used general computer systems do not provide for determining of job level 114 of employee 116 from set of organization information 130 based on one or more employee level models.

Figure 2:
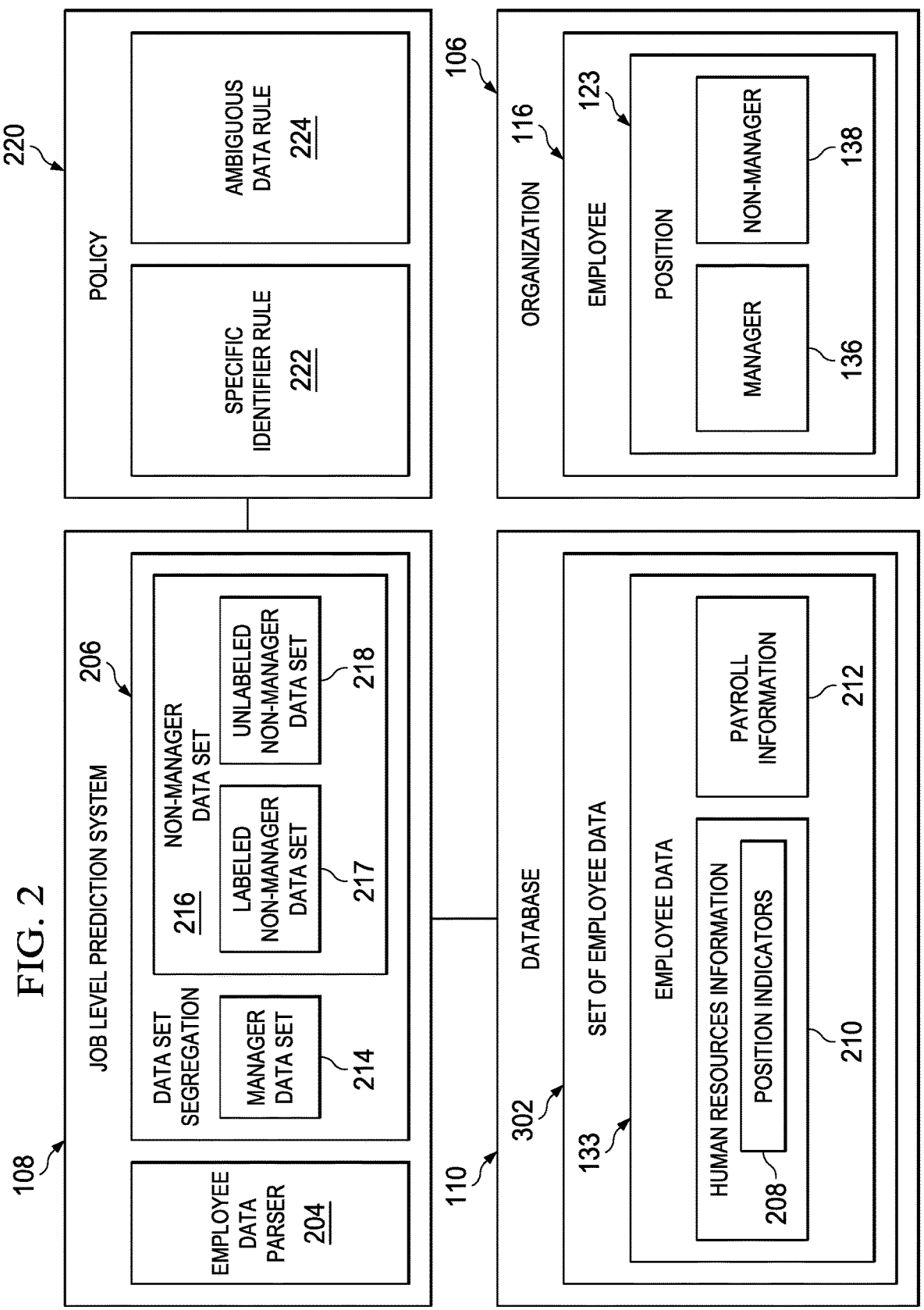
FIG. 2 is an illustration of a data flow for segregating employees into one of a number of data sets depicted in accordance with an illustrative embodiment.

With reference next to FIG. 2, an illustration of a data flow for segregating employees into a number of data sets is depicted in accordance with an illustrative embodiment. As depicted, job level prediction system 108 segregates set of employees 134, including employee 116, both shown in block form in FIG. 1, into one of a number of data sets based on the set of employee data.

As depicted, job level prediction system 108 includes a number of different components. As used herein, "a number of" means one or more different components. As depicted, job level prediction system 108 includes employee data parser 204, and data set segregation 206.

As depicted, job level prediction system 108 includes employee data parser 204. Employee data parser 204 identifies and parses employee data 133 for employee 116.

In this illustrative example, employee data 133 includes data about employee 116 in the context of organization 106. Employee data parser 204 parses employee data 133 for information indicative of job level 114, shown in block form in FIG. 1, of employee 116.

In this illustrative example, employee data 133 includes a number of different components. As depicted, employee data 133 includes position indicators 208, human resources information 210, and payroll information 212.

Position indicators 208 are information in employee data 133 that indicate position 123 of employee 116 within organization 106. Position indicators 208 may include indicators that indicate employee 106 has position 123 of manager 136 for organization 106. Position indicators 208 that indicate position 123 of manager 136 can include, for example but not limited to, a specific data entry of a managerial indication in employee data 133, a position of employee 116 in a reporting hierarchy of organization 106, a Standard Occupational Classification (SOC) of employee 116, a manager level description in employee data 133, and an Employee Information Report (EEO-1) of employee 116.

Position indicators 208 may include indicators that indicate employee 106 has position 123 of non-manager 138 for organization 106. Position indicators 208 that indicate position 123 of non-manager 138 can include, for example, but not limited to, a specific data entry of a non-managerial indication in employee data 133, a position of employee 116 in a reporting hierarchy of organization 106, a non-managerial level description in employee data 133, an Employee Information Report (EEO-1) of employee 116, and a Standard Occupational Classification (SOC) of employee 116.

Human resources information 210 is information in employee data 133 that is indicative of a position of employee 116 within organization 106. Human resources information 210 can include, for example not limited to, an Employee Information Report (EEO-1) of employee 116, a Standard Occupational Classification (SOC) of employee 116, a job title of employee 116, a North American Industry Classification System (NAICS) class of employee 116, a salary grade of employee 116, an age of employee 116, and a tenure of employee 116 at organization 106, as well as other possible information indicative of a position of employee 116 within organization 106.

Payroll information 212 is information in employee data 133 that is indicative of a compensation of employee 116 by organization 106. Payroll information 212 can include, for example not limited to, an annual base salary of employee 116, a bonus ratio of employee 116, and an overtime pay of employee 116, as well as other possible information indicative of a position of employee 116 within organization 106.

As depicted, job level prediction system 108 includes data set segregation 206. Data set segregation 206 segregates employee 116 into one of a number of data sets based on information parsed from employee data 133 by employee data parser 204.

In this illustrative example, data set segregation 206 segregates employee 116 into one of a number of data sets using policy 220. In this illustrative example, policy 220 includes one or more rules that are used to segregate employee 116 into the number of data sets. Policy 220 also may include data used to apply one or more rules. As used herein, the "group of," when used with reference to items, means one or more items. For example, a "group of rules" is one or more rules.

In this manner, job level prediction system 108 segregates employee 116 into one of a number of data sets based on information parsed from employee data 133 in a manner that meets policy 220. When employee 116 is segregated into one of a number of data sets based on information parsed from employee data 133, job levels, such as manager job level 142 and non-manager job level 146 shown in block form in FIG. 1, may be relied upon to perform operation 122 for organization 106 in this illustrative example.

With reference next to FIG. 3, an illustration of a data flow for separating ambiguously classified employees into one of a number of data sets is depicted in accordance with an illustrative embodiment. As depicted, job level prediction system 108 separates employee data 133 into manager data set 214 and non-manager data set 216 based on a statistical comparison of employee data 133 to set of employee data 302.

As depicted, job level prediction system 108 includes a number of different components. As depicted, job level prediction system 108 includes manager/non-manager classification model 304, manager data set 214, non-manager data set 216, labeled non-manager data subset 217 of non-manager data set 216, and unlabeled non-manager data subset 218 of non-manager data set 216.

As depicted, job level prediction system 108 includes manager/non-manager classification model 304. Manager/non-manager classification model 304 classifies employees in employee data 133 into manager data set 214 and non-manager data set 216 based on a statistical comparison of employee data 133 to set of employee data 302.

In this illustrative example, manager/non-manager classification model 304 classifies employees in employee data 133 into one of manager data set 214 and non-manager data set 216 using policy 220. In this illustrative example, policy 220 consists of cluster analysis rule 306. In this illustrative example, cluster analysis rule 306 classifies employees based on a statistical comparison of employee data 133 to manager cluster 308 and non-manager cluster 310.

As depicted, manager cluster 308 is a grouping of set of employees 134, shown in block form in FIG. 1, based on similarities in set of employee data 302. Manager cluster 308 groups employees of set of employees 134 in such a way that set of employee data 302 for set of employees 134 in manager cluster 308 is more similar to each other than to set of employee data 302 for set of employees 134 in non-manager cluster 310. In this illustrative example, manager cluster 308 is represented in manager/non-manager classification model 304 as centroid 312. In this illustrative example, centroid 312 is a mean vector that represents set of employee data 302 for set of employees 134 in manager cluster 308.

As depicted, non-manager cluster 310 is a grouping of set of employees 134 based on similarities in set of employee data 302. Non-manager cluster 310 groups employees of set of employees 134 in such a way that set of employee data 302 for set of employees 134 in non-manager cluster 310 is more similar to each other than to set of employee data 302 for set of employees 134 in manager cluster 308. In this illustrative example, non-manager cluster 310 is represented in manager/non-manager classification model 304 as centroid 314. In this illustrative example, centroid 314 is a mean vector that represents employee data 302 for set of employees 134 in non-manager cluster 310.

In this illustrative example, manager/non-manager classification model 304 applies cluster analysis rule 306 to compare data with centroid 312 and centroid 314 to the nearest cluster center. Based on cluster analysis rule 306, manager/non-manager classification model 304 determines whether employee 116 is more similar to manager cluster 308 or non-manager cluster 310. When employee 116 is more similar to manager cluster 308, manager/non-manager classification model 304 applies cluster analysis rule 306 to assign employee 116 to manager data set 214. When employee 116 is more similar to non-manager cluster 310, manager/non-manager classification model 304 applies cluster analysis rule 306 to assign employee 116 to non-manager data set 216.

Figure 4:
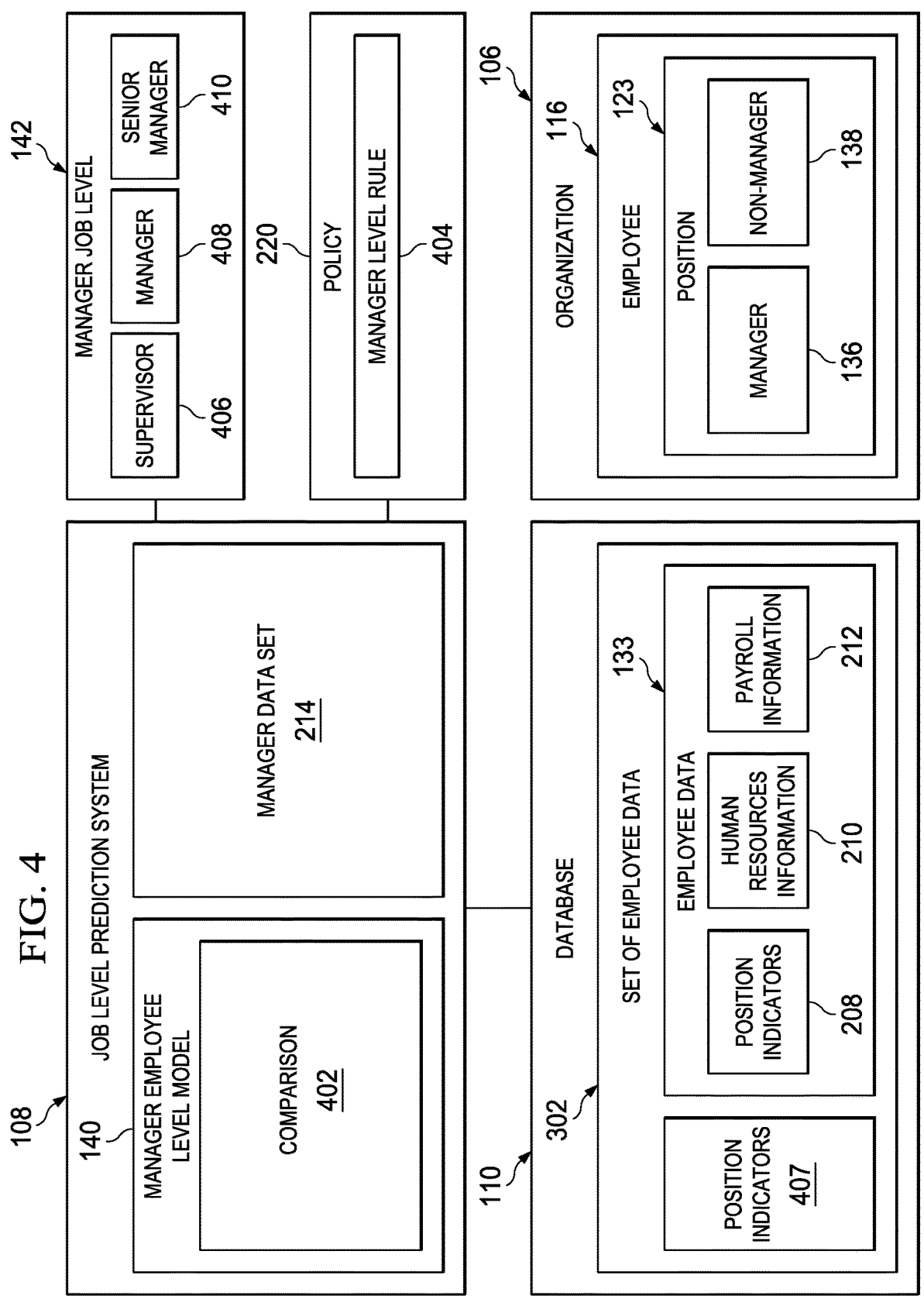
FIG. 4 is an illustration of a data flow for determining a manager job level for a manager employee depicted in accordance with an illustrative embodiment.

With reference next to FIG. 4, an illustration of a data flow for determining a manager job level for a manager employee is depicted in accordance with an illustrative embodiment. As depicted, job level prediction system 108 determines manager job level 142 when employee 116 is manager 136, and has been separated into manager data set 214.

As depicted, job level prediction system 108 includes a number of different components. As depicted, job level prediction system 108 includes manager employee level model 140, and manager data set 214.

As depicted, job level prediction system 108 includes manager employee level model 140. Manager employee level model 140 determines manager job level 142 for employee 116 based on comparison 402 of employee data 133 for employee 116 to set of employee data 302 for set of employees 134, shown in block form in FIG. 1, that have been grouped into manager data set 214.

In this illustrative example, manager employee level model 140 determines manager job level 142 for employee 116 using policy 220. In this illustrative example, policy 220 includes a group of rules that are used to determine manager job level 142 for employee 116.

In one illustrative example, policy 220 includes manager level rule 404. In this illustrative example, manager level rule 404 determines manager job level 142 for employee 116 based on comparison 402 of employee data 133 for employee 116 to set of employee data 302 for set of employees 134 that have been grouped into manager data set 214.

In this illustrative example, manager employee level model 140 applies manager level rule 404 to determine manager job level 142 of employee 116. In this illustrative example, manager job level 142 includes manager job levels of supervisor 406, manager 408, and senior manager 410.

In this illustrative example, supervisor 406 is one of manager job level 142 for manager 136 of organization 106. When employee 116 is at supervisor 406, employee 116 may have involvement in the hiring, development, and related personnel processes for organization 106. Employee 116 may work to specific measurable objectives of organization 106 requiring operational planning skill with little direct supervision. Employee 116 may have considerable latitude for making decisions within their employee group at organization 106.

In this illustrative example, manager 408 is one of manager job level 142 for manager 136 of organization 106. When employee 116 is at manager 408, employee 116 may have hire/fire authority over team members within organization 106. Employee 116 may work to broaden goals of organization 106 within their area of responsibility. Employee 116 may have significant latitude for making decisions for their operational or functional units within organization 106.

In this illustrative example, senior manager 410 is one of manager job level 142 for manager 136 of organization 106. When employee 116 is at senior manager 410, employee 116 may give strategic guidance to the units within organization 106 under their control. Employee 116 may develop and direct short and near term goals for their units within organization 106. Employee 116 may have broad decision-making latitude within their functional units of organization 106.

However, specific responsibilities and descriptions of supervisor 406, manager 408, and senior manager 410 may vary between set of organizations 105, shown in block form in FIG. 1. Therefore, in this illustrative example, manager employee level model 140 applies manager level rule 404 to determine manager job level 142 of employee 116 based on comparison 402 of employee data 133 for employee 116 to set of employee data 302.

In this illustrative example, manager employee level model 140 compares employee data 133 of employee 116, including at least one of position indicators 208, human resources information 210, and payroll information 212 to set of employee data 302 of similarly classified employees.

In this illustrative example, manager employee level model 140 compares position indicators 208 to position indicators 407. Position indicators 208 can include at least one of a specific data entry of a managerial indication in employee data 133, a position of employee 116 in a reporting hierarchy of organization 106, a managerial level description in employee data 133, an Employee Information Report (EEO-1) of employee 116, and combinations thereof. Position indicators 407 can include at least one of specific data entries of a managerial indication in set of employee data 302, positions of set of employees 134 in reporting hierarchies of set of organizations 105, managerial level descriptions in set of employee data 302, Employee Information Reports (EEO-1) of set of employees 134, and combinations thereof.

Based on comparison 402, manager employee level model 140 determines manager job level 142 of employee 116. In this illustrative example, manager job level 142 can be supervisor 406, manager 408, and senior manager 410. However, manager job level 142 can be any other suitable scale or metric that differentiates between levels of manager job level 142.

In this manner, job level prediction system 108, compares employee data 133 of employee 116 to at least one managerial indicator, and determines manager job level 142 of employee 116 based on comparison 402 in a manner that meets policy 220. When manager job level 142 is determined based on a comparison of employee data 133 of employee 116 to at least one managerial indicator, manager job level 142 may be relied upon to perform operations 122, shown in block form in FIG. 1, for organization 106 in this illustrative example.

Figure 5:
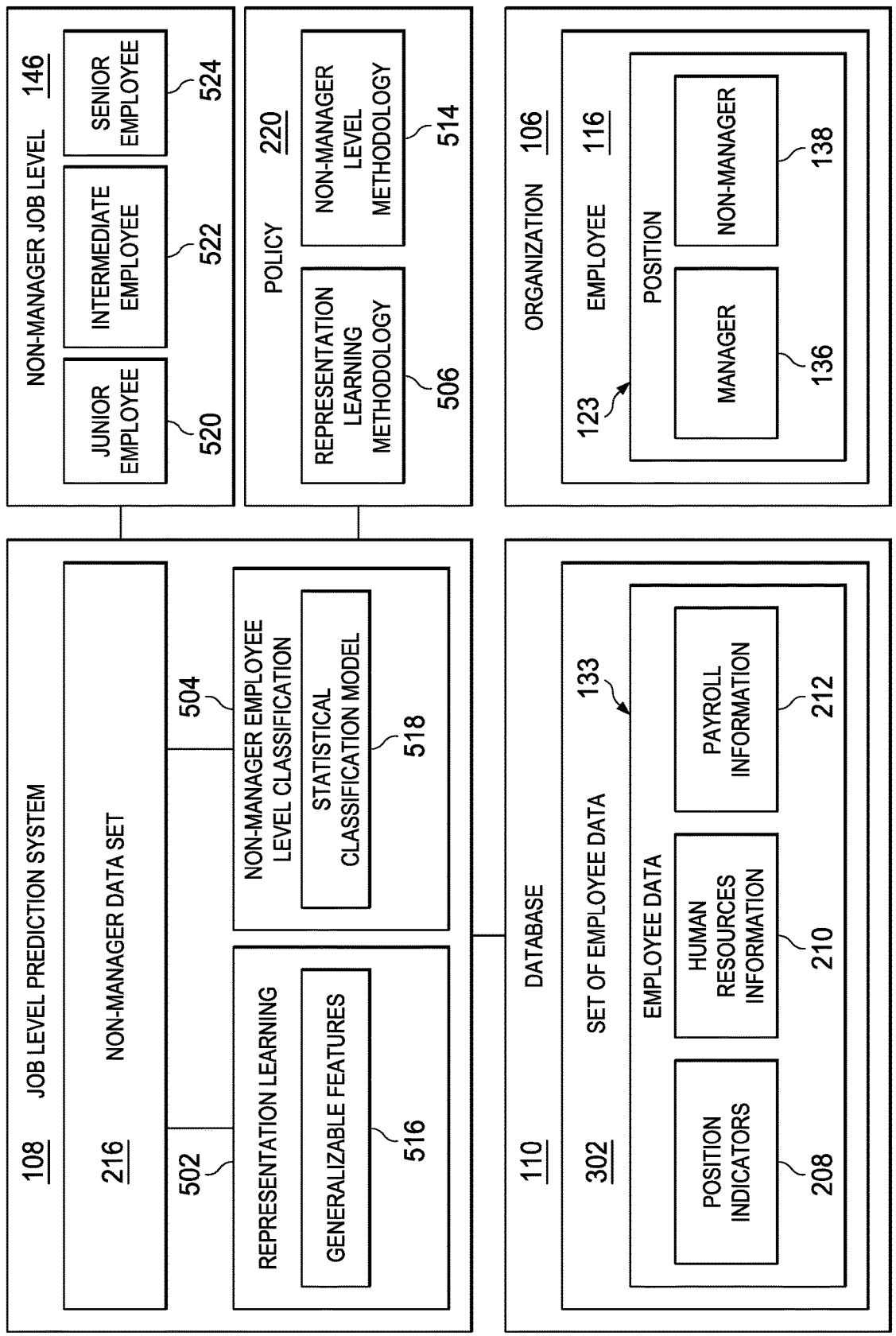
FIG. 5 is an illustration of a data flow for determining a non-manager job level for a non-manager employee depicted in accordance with an illustrative embodiment.

With reference next to FIG. 5, an illustration of a data flow for determining a non-manager job level for a non-manager employee is depicted in accordance with an illustrative embodiment. As depicted, job level prediction system 108 determines non-manager job level 146 when employee 116 is non-manager 138, and has been separated into non-manager data set 216.

As depicted, job level prediction system 108 includes a number of different components. As depicted, job level prediction system 108 includes representation learning 502, non-manager employee level classification 504, and non-manager data set 216.

As depicted, job level prediction system 108 includes non-manager employee level model 144. Non-manager employee level model 144 determines non-manager job level 146 for employee 116 based on a statistical comparison of employee data 133 to set of employee data 302, including non-manager employee level classification 504.

In this illustrative example, non-manager employee level model 144 determines non-manager job level 146 for employee 116 using policy 220. In this illustrative example, policy 220 includes a group of rules that are used to determine non-manager job level 146 for employee 116 for non-manager labeled data set 217, shown in block form in FIG. 2 and FIG. 3.

Generalizable features 516 are variables of compressed data that are inferred from representation learning 502. In this illustrative example, generalizable features 516 are data compressed from set of employee data 302 that best explain archetypical features of non-manager data set 216, or best distinguishes among a set of employee data 302 in non-manager data set 216, shown in block form in FIG. 2 and FIG. 3. In this illustrative example, generalizable features 516 are derived from both labeled and unlabeled data sets by applying clustering with a preset number of clusters.

In this illustrative example, latent variables can be a of sequential identifiers. For example, label 512 for each of data points may be an integer in the sequence 0, 1, 3, 4, 5, 6, 7, 9.

In this illustrative example, non-manager employee level classification 504 includes statistical classification model 518. Statistical classification model 518 is a model for classifying employee data 133 for employee 116 into non-manager job level 146, such as a random forest method model. As illustrated, statistical classification model 518 uses generalizable features 516 to perform statistical comparison of employee data 133 to non-manager data set 216 shown in block form in FIG. 2 and FIG. 3.

In this illustrative example, non-manager employee level model 144 applies non-manager employee level classification 504 to determine non-manager job level 146 of employee 116. In this illustrative example, non-manager job level 146 includes non-manager job levels of junior employee 520, intermediate employee 522, and senior employee 524.

In this illustrative example, junior employee 520 is one of non-manager job level 146 for non-manager 138 of organization 106. When employee 116 is at junior employee 520, employee 116 may follow standard work routines and works under close supervision. Employee 116 may have little decision making ability. Employee 116 may have no budgetary responsibilities, or abilities to spend on behalf of organization 106 without approval.

In this illustrative example, intermediate employee 522 is one of non-manager job level 146 for non-manager 138 of organization 106. When employee 116 is at intermediate employee 522, employee 116 may have procedural or systems experience relevant to organization 106. Employee 116 may work under general supervision, where their decisions are based on established procedures of organization 106. Employee 116 may have nominal budgetary responsibilities or abilities to spend on behalf of organization 106.

In this illustrative example, senior employee 524 is one of non-manager job level 146 for non-manager 138 of organization 106. When employee 116 is at senior employee 524, employee 116 may have involvement in the hiring, development, and related personnel processes for organization 106. Employee 116 may work to specific measurable objectives of organization 106 requiring operational planning skill with little direct supervision. Employee 116 may have considerable latitude for making decisions within their employee group at organization 106.

However, specific responsibilities and descriptions of junior employee 520, intermediate employee 522, and senior employee 524 may vary between set of organizations 105. Therefore, in this illustrative example, non-manager employee level model 144 applies non-manager level methodology 514 to determine non-manager job level 146 of employee 116 based on non-manager employee level classification 504 of employee data 133 for employee 116.

In this manner, job level prediction system 108 determines which a number of unlabeled non-manager data set 218 that employee data 133 of the employee 116 is most similar to, based on a random forest model of set of employee data 302. Job level prediction system 108 uses generalizable features. Job level prediction system 108 determines non-manager job level 146 of employee 116 based on employee data 133 and the generalizable features 516.

Furthermore, in statistically determining non-manager job level 146, job level prediction system 108 applies statistical classification model 518, of non-manager employee level classification 504, such as random forest method model, based on employee data 133 and generalizable features 516. Job level prediction system 108 can then determine non-manager job level 146 of employee 116 based on a mode output of statistical classification model 518.

In this manner, job level prediction system 108, applies representation learning 502 and non-manager employee level classification 504 to determine non-manager job level 146 of employee 116.

Figure 6:
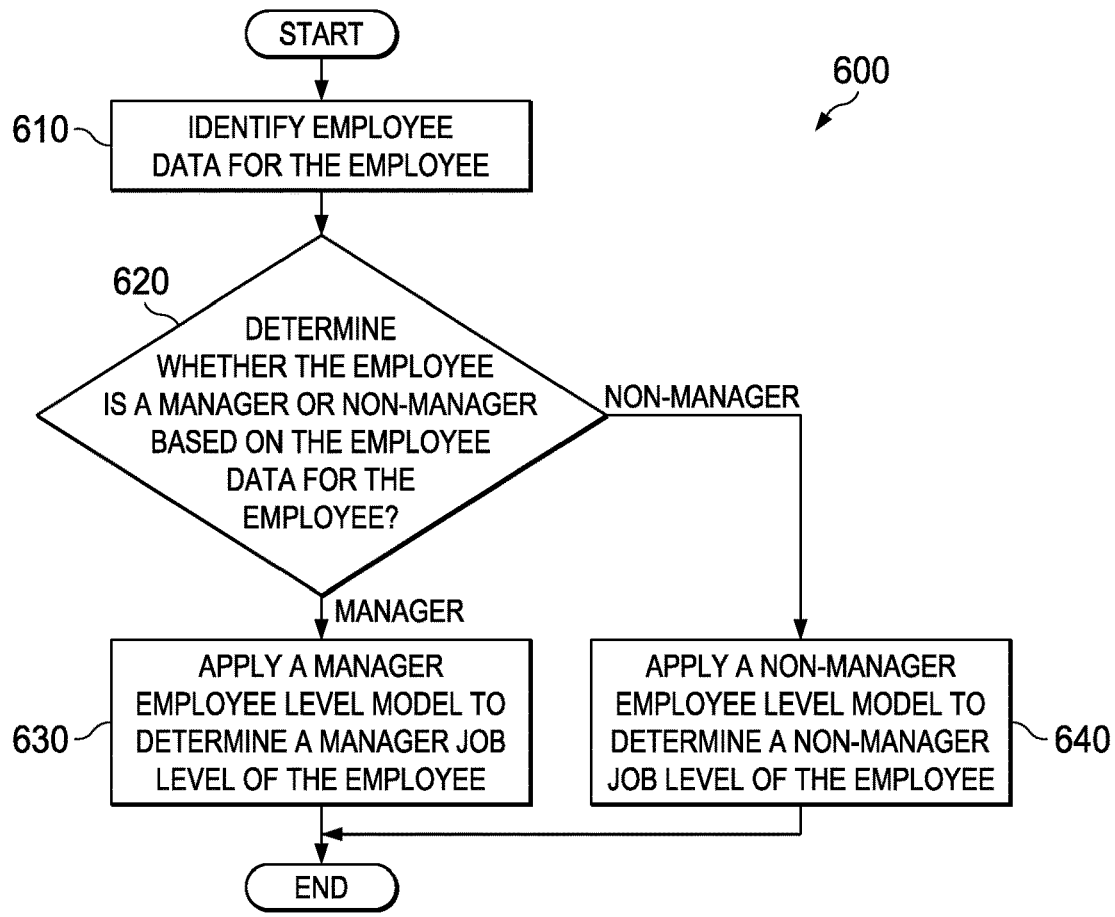
FIG. 6 is an illustration of a flowchart of a process for determining job levels of an employee within an organization depicted in accordance with an illustrative embodiment.

Turning next to FIG. 6, an illustration of a flowchart of a process for determining job levels of an employee within an organization is depicted in accordance with an illustrative embodiment. The process illustrated in FIG. 6 may be implemented in information environment 100 in FIG. 1. For example, the process may be implemented as operations performed by job level prediction system 108 in FIG. 1.

The process 600 begins identifying employee data for the employee (step 610). The employee data can be, for example, employee data 133 in information 104 of FIG. 1.

Next, process 600 determines whether the employee is a manager or non-manager based on the employee data for the employee (step 620). In response to determining that the employee is a manager ("manager" at step 620), process 600 applies a manager employee level model to determine a manager job level of the employee (step 630), with the process terminating thereafter.

Returning to step 620, In response to determining that the employee is a non-manager ("non-manager" at step 620), process 600 applies a non-manager employee level model to determine a non-manager job level of the employee (step 640), with the process terminating thereafter.

Figure 7:
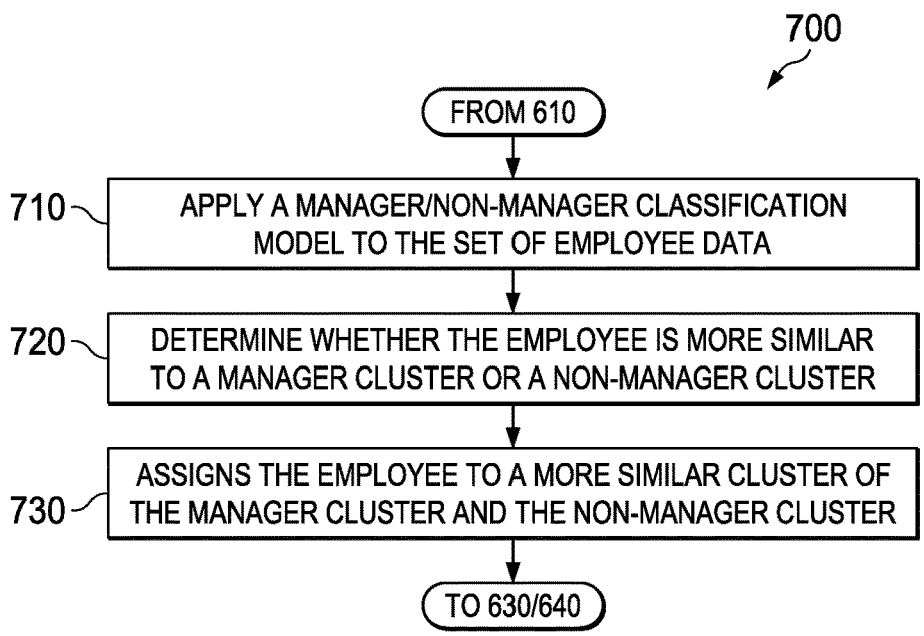
FIG. 7 is an illustration of a flowchart of a process for determining whether an employee is a manager or non-manager of an organization depicted according to an illustrative embodiment.

With reference now to FIG. 7, an illustration of a flowchart of a process for determining whether an employee is a manager or non-manager of an organization is depicted according to an illustrative embodiment. As depicted, process 700 is a more detailed implementation of process step 620 of FIG. 6, when employee data 133 includes conflicting or ambiguous indications regarding the position of employee 116.

Process 700 begins by applying a manager/non-manager classification model to the set of employee data (step 710). The manager/non-manager classification model can be, for example, manager/non-manager classification model 304 of FIG. 3.

Process 700 then determines whether the employee is more similar to a manager cluster or a non-manager cluster (step 720). The determination can be based on a cluster analysis, such as cluster analysis rule 306 of FIG. 3.

Process 700 then assigns the employee to a more similar cluster of the manager cluster and the non-manager cluster (step 730). Process 700 then proceeds to one of step 630 or step 640 of FIG. 6.

Figure 8:
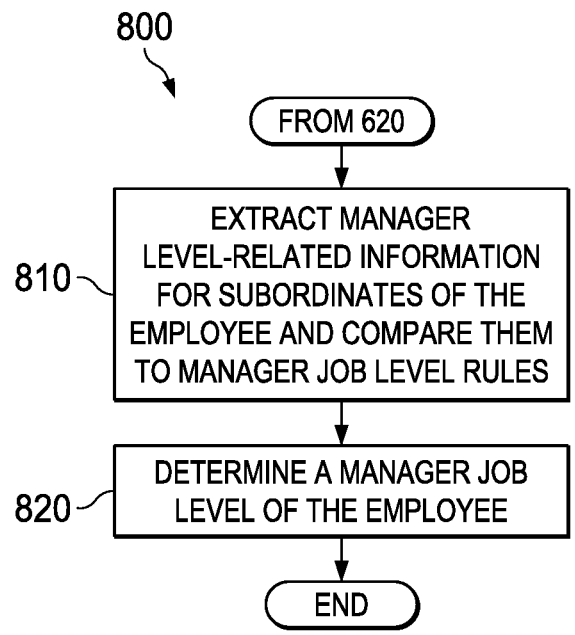
FIG. 8 is an illustration of a flowchart for applying a manager employee level model depicted according to an illustrative embodiment.

With reference now to FIG. 8, an illustration of a flowchart for applying a manager employee level model is depicted according to an illustrative embodiment. As depicted, process 800 is a more detailed implementation of process step 630 of FIG. 6.

Process 800 begins by extracting the employee data of the employee related to managerial indicators (step 810). The managerial indicator can be one or more of the position indicators 208 of FIG. 2. The managerial indicator, can include at least one of a specific data entry of a managerial indication in employee data 133, a position of employee 116 in a reporting hierarchy of organization 106, a managerial level description in employee data 133, an Employee Information Report (EEO-1) of employee 116, and combinations thereof.

Process 800 then determines the manager job level of the employee from the comparison (step 820), with the process terminating thereafter.

Figure 9:
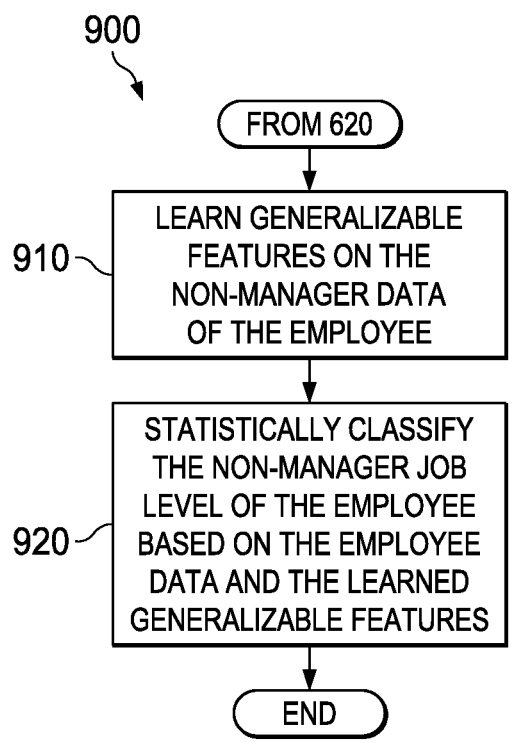
FIG. 9 is an illustration of a flowchart of a process for applying a non-manager employee level model depicted according to an illustrative embodiment.

With reference now to FIG. 9, an illustration of a flowchart of a process for applying a non-manager employee level model is depicted according to an illustrative embodiment. As depicted, process 900 is a more detailed implementation of process step 640 of FIG. 6.

Process 900 begins by learning generalizable features both from labeled and non-labeled subsets of non-manager data(step 910). The feature learning can be based on a cluster analysis of the employee data to provide representation learning methodology 506 of FIG. 5.

Process 900 then statistically classifies the non-manager job level of the employee based on the employee data and the learned generalizable features (step 920), with the process terminating thereafter. In this manner, performing operations for an organization, such as operations 122 of FIG. 1, is enabled using the processes implemented in job level prediction system 108.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
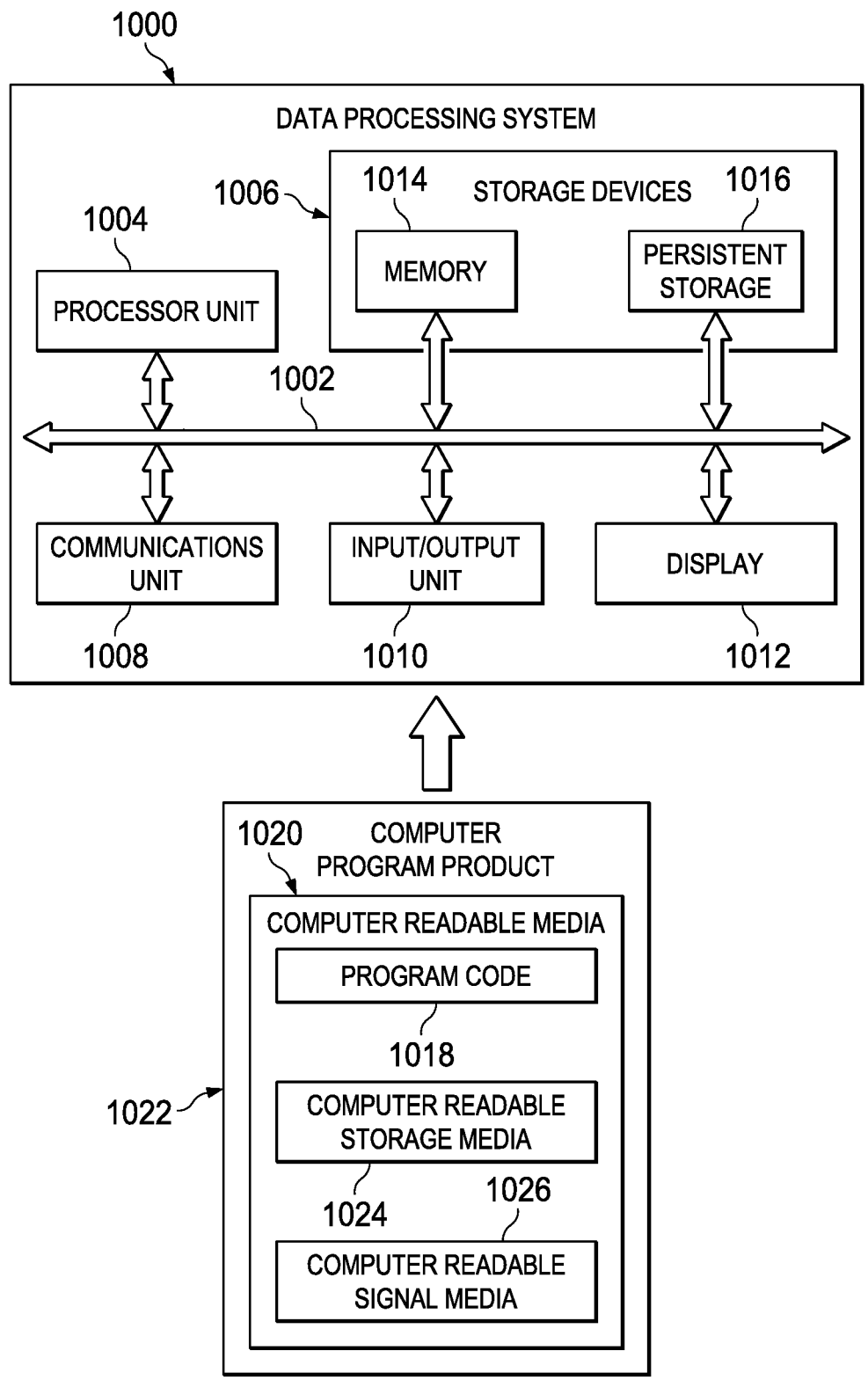
FIG. 10 is an illustration of a block diagram of a data processing system depicted in accordance with an illustrative embodiment.

Turning now to FIG. 10, an illustration of a block diagram of a data processing system is depicted in accordance with an illustrative embodiment. Data processing system 1000 may be used to implement one or more computers and computer system 112 in FIG. 1. In this illustrative example, data processing system 1000 includes communications framework 1002, which provides communications between processor unit 1004, memory 1014, persistent storage 1016, communications unit 1008, input/output unit 1010, and display 1012. In this example, communications framework 1002 may take the form of a bus system.

Processor unit 1004 serves to execute instructions for software that may be loaded into memory 1014. Processor unit 1004 may be a number of processors, a multi-processor core, or some other type of processor, depending on the particular implementation.

Memory 1014 and persistent storage 1016 are examples of storage devices 1006. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1006 may also be referred to as computer-readable storage devices in these illustrative examples. Memory 1014, in these examples, may be, for example, a random access memory or any other suitable volatile or non-volatile storage device. Persistent storage 1016 may take various forms, depending on the particular implementation.

For example, persistent storage 1016 may contain one or more components or devices. For example, persistent storage 1016 may be a hard drive, a flash memory, a rewritable optical disk, a rewritable magnetic tape, or some combination of the above. The media used by persistent storage 1016 also may be removable. For example, a removable hard drive may be used for persistent storage 1016.

Communications unit 1008, in these illustrative examples, provides for communications with other data processing systems or devices. In these illustrative examples, communications unit 1008 is a network interface card.

Input/output unit 1010 allows for input and output of data with other devices that may be connected to data processing system 1000. For example, input/output unit 1010 may provide a connection for user input through at least of a keyboard, a mouse, or some other suitable input device.

Further, input/output unit 1010 may send output to a printer. Display 1012 provides a mechanism to display information to a user.

Instructions for at least one of the operating system, applications, or programs may be located in storage devices 1006, which are in communication with processor unit 1004 through communications framework 1002. The processes of the different embodiments may be performed by processor unit 1004 using computer-implemented instructions, which may be located in a memory, such as memory 1014.

These instructions are referred to as program code, computer-usable program code, or computer-readable program code that may be read and executed by a processor in processor unit 1004. The program code in the different embodiments may be embodied on different physical or computer-readable storage media, such as memory 1014 or persistent storage 1016.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Alternatively, program code 1018 may be transferred to data processing system 1000 using computer-readable signal media 1026.

Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

Thus, the illustrative embodiments provide a method and apparatus for determining job levels for employees of an organization. By determining job level 114 of employee 116, job level prediction system 108 enables more efficient performance of operations 122 for organization 106. In this illustrative example, operations 122 is an operation performed for the benefit of organization 106. For example, operations 122 can be operations such as, but not limited to, at least one of hiring, benefits administration, payroll, performance reviews, forming teams for new products, assigning research projects, or other suitable operations for organization 106.

Furthermore, determination of job level 114 by job level prediction system 108 allows organization 106 to perform operations 122 in a manner that standardizes compensation for set of employees 134 across equivalent skill sets and responsibilities. Job level prediction system 108 enables organization 106 to perform operations 122 that address the business needs of organization 106, including attracting and retaining qualified employees, and providing compensation competitive with other organizations.

Thus, the illustrative examples provide one or more technical solutions to overcome a technical problem of determining job levels for an employee of an organization. The use of job level prediction system 108 has a technical effect of determining job level 114 of employee 116 based on set of organization information 130, thereby reducing time, effort, or both in the performance of operations 122. In this manner, operations 122 performed for organization 106 may be performed more efficiently as compared to currently used systems that do not include job level prediction system 108. For example, manager job level 142 and non-manager job level 146 may be used in operations 122 selected from at least one of hiring, benefits administration, payroll, performance reviews, forming teams for new products, assigning research projects, or other suitable operations for organization 106.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method, comprising:
   a computer system performing an operation for an organization based on a differentially determined job level of an employee within the organization by:
   identifying employee data for the employee, wherein the employee data comprises at least one of a Standard Occupational Classification (SOC), an Employee Information Report (EEO-1), or payroll information;
   determining whether the employee is a manager or a non-manager based on a first comparison, wherein the first comparison comprises a statistical comparison of the employee data for the employee to a set of employee data for a set of organizations;
   responsive to determining that the employee is a manager, applying a manager employee level model to differentially determine a manager job level of the employee based on a second comparison, wherein the second comparison comprises a comparison of the employee data for the employee to the set of employee data for the set of organizations;
   responsive to determining that the employee is a non-manager, applying a non-manager employee level model to differentially determine a non-manager job level of the employee based on a third comparison, wherein the third comparison comprises a statistical comparison of the employee data for the employee to the set of employee data for the set of organizations; and responsive to differentially determining the job level of the employee, performing the operation for the organization based on the differentially determined manager job level of the employee or the non-manager job level of the employee.

2. The method of claim 1, wherein the employee data for the employee comprises:

human resources information, payroll information, managerial indicators, and non-managerial indicators.

3. The method of claim 2, wherein:

the human resources information comprises an employee information report of the employee, a standard occupational classification of the employee, a job title of the employee, a North American Industry Classification System class of the employee, a salary grade of the employee, and age of the employee, and a tenure of the employee at the organization;

the payroll information comprises an annual base salary of the employee; a bonus ratio of the employee; and overtime pay of the employee;

the managerial indicators comprise a specific managerial indication, a reporting hierarchy of the organization, a manager level description, and the employee information report of the employee; and the non-managerial indicators comprise a specific non-managerial indication, the reporting hierarchy of the organization, a non-managerial level description, the employee information report of the employee, the standard occupational classification of the employee, the annual base salary of the employee, and a bonus ratio of the employee.

4. The method of claim 1, wherein the determining comprises:

applying-a manager/non-manager classification model to the employee data and the set of employee data, wherein the employee data is for the employee, and the set of employee data is for the set of organizations;

determining, by the manager/non-manager classification model, whether the employee data for the employee is more similar to a manager cluster or a non-manager cluster based on a cluster analysis of the set of employee data for the set of organizations, wherein each of the manager cluster and the non-manager cluster is represented by a corresponding centroid determined from the set of employee data for a set of employees in the set of organizations;

determining that the employee is a manager in response to a determination that the employee data for the employee is more similar to the manager cluster than to the non-manager cluster; and determining that the employee is a non-manager in response to a determination that the employee data for the employee is more similar to the non-manager cluster than to the manager cluster.

5. The method of claim 4, wherein applying the manager employee level model comprises:

comparing the employee data for the employee to at least one managerial indicator in the set of employee data for the set of organizations to form the second comparison, wherein the managerial indicator is selected from a list of indicators consisting of: a specific managerial indication, a position in a reporting hierarchy, a manager level description in the reporting hierarchy, and an employee information report.

6. The method of claim 4, wherein applying the non-manager employee level model further comprises:

determining, by the non-manager employee level model analyzing non-manager data, at least one latent variable from labeled non-manager data and non-labeled non-manager data; and statistically classifying, by the non-manager employee level model, the non-manager job level of the employee based on the employee data for the employee and the at least one latent variable.

7. The method of claim 6, wherein statistically classifying the non-manager job level further comprises:

applying, by the non-manager employee level model, a random forest statistical classification based on the employee data for the employee and the at least one latent variable, trained on a labeled subset of the non-manager data; and determining, by the non-manager employee level model, the non-manager job level of the employee on a non-labeled subset of the non-manager data, based on a mode output of the random forest statistical classification.

8. The method of claim 1, wherein the operation is enabled based on the determined manager job level of the employee or non-manager job level of the employee.

9. The method of claim 1, wherein the operation is selected from hiring operations, benefits administration operations, payroll operations, performance review operations, forming teams for new products, and assigning research projects.

10. A computer system, comprising:

a processor implementing a job level prediction system for determining a job level of an employee within an organization, wherein the job level prediction system is configured to:

identify employee data for the employee, wherein the employee data comprises at least one of a Standard Occupational Classification (SOC), a manager level description, a non-managerial level description, an Employee Information Report (EEO-1), or payroll information;

determine whether the employee is a manager or a non-manager based on a first comparison, wherein the first comparison is a statistical comparison of the employee data for the employee to a set of employee data for a set of organizations;

responsive to determining that the employee is a manager, apply a manager employee level model to determine a manager job level of the employee based on a second comparison, wherein the second comparison comprises a comparison of the employee data for the employee to the set of employee data for the set of organizations; and responsive to determining that the employee is a non-manager, apply a non-manager employee level model to determine a non-manager job level of the employee based on a third comparison, wherein the third comparison comprises a statistical comparison of the employee data for the employee to the set of employee data for the set of organizations; and wherein the computer system is configured to perform an operation for the organization based on the determined manager job level of the employee or non-manager job level of the employee.

11. The computer system of claim 10, wherein the employee data for the employee comprises:
   human resources information, payroll information, managerial indicators, and non-managerial indicators.

12. The computer system of claim 11, wherein:
   the human resources information comprises an employee information report of the employee, a standard occupational classification of the employee, a job title of the employee, a North American Industry Classification System class of the employee, a salary grade of the employee, and age of the employee, and a tenure of the employee at the organization;
   the payroll information comprises an annual base salary of the employee; a bonus ratio of the employee; and overtime pay of the employee;
   the managerial indicators comprise a specific managerial indication, a reporting hierarchy of the organization, a manager level description, and the employee information report of the employee; and
   the non-managerial indicators comprise a specific non-managerial indication, the reporting hierarchy of the organization, a non-managerial level description, the employee information report of the employee, the standard occupational classification of the employee, the annual base salary of the employee, and a bonus ratio of the employee.

13. The computer system of claim 10, wherein, in determining whether the employee is manager or non-manager, the job level prediction system is further configured to:
   apply a manager/non-manager classification model to the employee and the set of employee data, wherein the employee data is for the employee, and the set of employee data is for the set of organizations;
   determine whether the employee data for the employee is more similar to a manager cluster or a non-manager cluster based on a cluster analysis of the set of employee data for the set of organizations, wherein each of the manager cluster and the non-manager cluster is represented by a corresponding centroid determined from the set of employee data for a set of employees in the set of organizations;
   determine that the employee is a manager in response to a determination that the employee data for the employee is more similar to the manager cluster than to the non-manager cluster; and
   determine that the employee is a non-manager in response to a determination that the employee data for the employee is more similar to the non-manager cluster than to the manager cluster.

14. The computer system of claim 10, wherein, in applying the manager employee level model, the job level prediction system is configured to compare the employee data for the employee to at least one managerial indicator in the set of employee data for the set of organizations to form the second comparison, wherein the managerial indicator is selected from a list of indicators consisting of a specific managerial indication, a position in a reporting hierarchy of the organization, a manager level description in the reporting hierarchy of the organization, and an employee information report.

15. The computer system of claim 10, wherein, in applying the non-manager employee level model, the job level prediction system is further configured to:
   determine at least one latent variable from both labeled and non-labeled data; and
   statistically classify the non-manager job level of the employee based on the employee data for the employee and the at least one latent variable.

16. The computer system of claim 15, wherein in statistically classifying the non-manager job level, the job level prediction system is further configured to:
   apply a random forest statistical classification based on the employee data for the employee and the at least one latent variable; and
   determine the non-manager job level of the employee based on a mode output of the random forest statistical classification.

17. The computer system of claim 10, wherein the operation is enabled based on the determined manager job level of the employee or non-manager job level of the employee.

18. The computer system of claim 10, wherein the operation is selected from hiring operations, benefits administration operations, payroll operations, performance review operations, forming teams for new products, and assigning research projects.

19. A computer program product comprising:
   a non-transitory computer-readable storage medium including instructions for performing an operation for an organization based on a determined job level of an employee within the organization, wherein the instructions comprise:
      first program code for identifying employee data for the employee, wherein the employee data comprises at least one of a Standard Occupational Classification (SOC) or an Employee Information Report (EEO-1);
      second program code for determining whether the employee is a manager or a non-manager based on a first comparison, wherein the first comparison is a statistical comparison of the employee data for the employee to a set of employee data for a set of organizations;
      third program code for applying a manager employee level model to determine a manager job level of the employee in response to determining that the employee is a manager based on a second comparison, wherein the second comparison comprises a comparison of the employee data for the employee to the set of employee data for the set of organizations;
      fourth program code for applying a non-manager employee level model to determine a non-manager job level of the employee in response to determining that the employee is a non-manager; and
      fifth program code for performing the operation for the organization based on the determined manager job level of the employee or the non-manager job level of the employee.

20. The computer program product of claim 19, wherein the employee data for the employee comprises:
   human resources information, payroll information, managerial indicators, and non-managerial indicators.

21. The computer program product of claim 20, wherein:
   the human resources information comprises an employee information report of the employee, a standard occupational classification of the employee, a job title of the employee, a North American Industry Classification System class of the employee, a salary grade of the employee, and age of the employee, and a tenure of the employee at the organization;
   the payroll information comprises an annual base salary of the employee; a bonus ratio of the employee; and overtime pay of the employee;

the managerial indicators comprise a specific managerial indication, a reporting hierarchy of the organization, a manager level description, and the employee information report of the employee; and the non-managerial indicators comprise a specific non-managerial indication, the reporting hierarchy of the organization, a non-managerial level description, the employee information report of the employee, the standard occupational classification of the employee, the annual base salary of the employee, and a bonus ratio of the employee.

22. The computer program product of claim 19, wherein the second program code further comprises:

sixth program code for applying a manager/non-manager classification model to the employee data and the set of employee data;

seventh program code for determining whether the employee data for the employee is more similar to a manager cluster or a non-manager cluster based on a cluster analysis of the set of employee data for the set of organizations, wherein each of the manager cluster and the non-manager cluster is represented by a corresponding centroid determined from the set of employee data for a set of employees in the set of organizations;

eighth program code for determining that the employee is a manager in response to a determination that the employee data for the employee is more similar to the manager cluster than to the non-manager cluster; and ninth program code for determining that the employee is a non-manager in response to a determination that the employee data for the employee is more similar to the non-manager cluster than to the manager cluster.

23. The computer program product of claim 19, wherein the third program code further comprises:

sixth program code for comparing the employee data for the employee to at least one managerial indicator to form the second comparison, wherein the managerial indicator is selected from a list of indicators consisting of: a specific managerial indication, a position in a reporting hierarchy, a manager level description in the reporting hierarchy, and an employee information report.

24. The computer program product of claim 19, wherein the fourth program code further comprises:

sixth program code for determining which of a number of labeled data clusters that the employee data of the employee is most similar to, based on a cluster analysis of the employee data, wherein each of the number of labeled data clusters is represented by a corresponding centroid determined from a set of employees in a set of organizations;

seventh program code for determining at least one latent variable from a non-manager data cluster; and eighth program code for statistically classifying the non-manager job level of the employee based on the employee data and the at least one latent variable.

25. The computer program product of claim 24, wherein statistically classifying the non-manager job level further comprises:

ninth program code for applying a random forest statistical classification based on the employee data and the at least one latent variable; and tenth program code for determining a non-manager job level of the employee based on a mode output of the random forest statistical classification.

26. The computer program product of claim 19, wherein the operation is enabled based on the determined manager job level of the employee or non-manager job level of the employee.

27. The computer program product of claim 19, wherein the operation is selected from hiring operations, benefits administration operations, payroll operations, performance review operations, forming teams for new products, and assigning research projects.

\* \* \* \* \*